Jan. 11, 1955   E. O. GAGUSKI   2,699,141
ILLUMINATED KNOB
Filed Nov. 24, 1950

EDWARD O. GAGUSKI
*INVENTOR.*

BY
*Killman and Kerst*
*ATTORNEYS*

United States Patent Office 2,699,141
Patented Jan. 11, 1955

2,699,141

ILLUMINATED KNOB

Edward O. Gaguski, Baltimore, Md., assignor to Bendix Aviation Corporation, Towson, Md., a corporation of Delaware Application November 24, 1950, Serial No. 197,445

1 Claim. (Cl. 116—124.4)

The invention relates to knobs and more particularly to rotatable knobs of the type utilized on control panels. Such knobs are often utilized, for example, on aircraft control panels for establishing and varying various relationships in instruments and other types of equipment. Such a knob may, for instance, be utilized to control the setting of a switch to an "on" or "off" position, in which case it is desirable that the pilot, at all times, be able to tell which position the switch is in.

A desirable way of conveying this information to the pilot is to provide some sort of reference indication on the knob itself which points to one of two or more reference marks on the panel to indicate the position of the switch.

In such locations it is desirable that the reference indication be visible both by day and by night and yet it is not desired that any significant amount of illumination, which may be used to render the indication visible at night, be allowed to escape into the cockpit, since it tends to blind the pilot to surrounding objects outside the airplane.

There have been designed systems for illuminating reference marks on dials so that they fulfill these requirements. One of these systems involves the use of dial or panel faces of transparent plastic which are edge lighted. The exterior surface of the dial or panel is coated with a translucent material, preferably of a white color. Superimposed on this coating is a layer of opaque material which is preferably black. Reference indicia are cut through the outer opaque coating to allow the translucent white coating to become visible and form the reference character or indicia. By daylight the characters are visible as white marks against a black background. By utilizing a red light for night lighting the characters are visible at night as red markings against a black background.

While this means has proven satisfactory for dial lighting, no means has heretofore been known by which it could be utilized to render visible, at night, reference markings on the upper surfaces of a control or indicator knob. While attempts have been made a convey light from the illuminated dial or panel into the knob for the illumination of such markings, they have not succeeded in providing satisfactory illumination of the markings, either as to the amount of the illumination or as to its uniformity over a 360° rotation of the knob.

It is an object of this invention to provide a control or indicator knob with means for illuminating reference markings formed in the upper surface thereof in a satisfactory manner.

It is a further object of the invention to provide such a knob with means for illuminating it substantially uniformly throughout a complete revolution thereof.

It is another object of the invention to provide for such illumination without introducing the leakage of objectionable amounts of light, either from the knob or the means upon which it is mounted.

It is a still further object of the invention to provide such a knob which will not develop light leaks after prolonged useage.

The objects and advantages of the invention are realized by a knob having its major portion formed of clear plastic or other light conducting material, with a central metal insert by which it may be secured to a control shaft. The knob is covered with a jacket of metal or opaque material. The skirt of the knob is inserted into an opening formed in the face of an edge illuminated dial and an internal mitered fillet is formed in the lower surface of the knob. The upper edge of the knob formed by the juncture of the top and side walls is also mitered. Reference markings to be illuminated are cut through the metal jacket and into the plastic material of the knob and are lined with a translucent material.

Referring now to the drawings.

Figure 1:
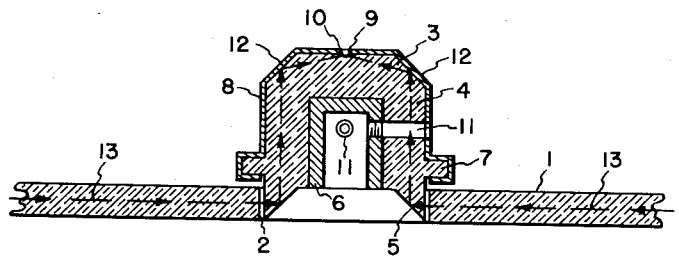
Fig. 1 is an elevational view in cross-section of a knob embodying the invention.
Figure 2:
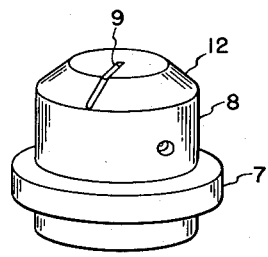
Fig. 2 is a perspective view of the knob of Fig. 1.

Referring now more particularly to the drawing, there is shown in Fig. 1 a fragment of an edge illuminated dial or panel member 1, having formed therein a circular hole 2. The member 1 will hereinafter be referred to simply as a dial member, the term being intended to include the member functioning as a panel. A knob 3 has its lower portion inserted into the hole 2. The knob is constructed of a body 4 of light conducting plastic material, having cut into its lower portion a recess having its lateral wall 5 beveled or mitered at an angle of forty-five degrees to the base of the knob. Inserted into the center of the knob, from the lower end thereof, is an annular ferrule 6 which may be of brass or other suitable material. The ferrule provides a means by which the knob may be attached to a shaft. It is not involved in the illumination of the knob.

Formed on the lower exterior portion of the knob, just above the upper surface of the dial, is an annular shoulder 7. The plastic material 4 is covered over the upper portion of the knob and the shoulder 7 with a jacket 8 of metal.

Cut into the metal jacket 8 and into the plastic 4, just below it, is a reference mark or indicia 9 which is shown in the form of a straight line starting at the middle of the top surface of the knob and extending out to the edge thereof. The inside of this cut may be coated with a layer 10 of translucent material. The cut should extend appreciably into the plastic material in order that it may intercept sufficient light for adequate illumination. As shown at 12, the upper edge portion of the knob formed by the juncture of the top surface and the side wall is beveled to an angle of slightly more than forty-five degrees with respect to the base of the knob. A pair of small holes 11 extend from the outer surface of the knob through the ferrule 6 for the reception of set screws to secure the knob to its control shaft. The ferrule portion of these holes is threaded for this purpose. The lateral surfaces of the plastic material are polished before the metal jacket 8 is applied or are coated with a white opaque reflecting material. The surface 5 of the recess formed in the bottom of the knob is likewise polished or coated with reflecting material.

In operation the dial 1 is edge illuminated for night time use and light, passing through the dial in the manner indicated by the dotted arrows 13, impinges upon the polished beveled surface 5, whereupon it is directed upwardly as indicated until it hits the beveled portion 12 at the upper edge of the knob. It is here bent through an angle slightly less than ninety degrees and thus directed to the indicia 9. It diffuses through the translucent material which lights this mark and is reflected upwardly to the eye of an observer.

Figure 3:
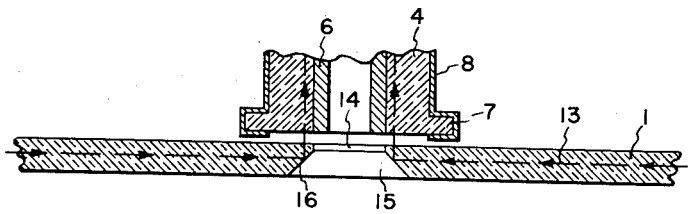
Fig. 3 is a cross-sectional view of an alternative form of knob and dial or panel arrangement of Fig. 1.

Fig. 3 illustrates another embodiment of the invention in which the knob 3 is not provided with a beveled recess in its lower portion. Instead the lower surface of the knob is flat. The lower portion of the knob terminates at the lower edge of the shouldered portion 7 and does not extend down into the dial as in the form of the invention illustrated in Fig. 1. The dial is provided with a hole, the upper portion 14 of which has the same diameter as the ferrule 6. The lower portion 15 of the hole is beveled as indicated at 16, the beveled portion being polished or coated with reflecting material.

In this form of the invention light travels as indicated by the dotted line 13, through the dial 1 until it impinges on the beveled surface 16. At this point it is reflected upwardly into the knob, the upper portion of which corresponds with that of the knob of Fig. 1.

It can be seen that the applicant has succeeded in providing a means for rendering effectively visible both by day or night, a reference marking formed in the upper surface of a rotatable knob and that the illumination of the marking will not vary appreciably throughout the rotation of the knob. This has been accomplished simply by virtue of the structural arrangement of the dial and the knob itself without requiring additional members for leading and directing the light and without complicating the structure of the dial. Light loss is avoided at the junction between the knob and the dial and through the knob itself, the metal jacket guarantees that sources of light loss will not develop in the knob by reason of abrasion occurring during its use.

Wherever the knob is referred to, in the specification and claim, as being above the dial or panel and the terms upper, and lower are applied to portions of the knob, it is to be understood that reference is intended only to location with respect to the dial as viewed by an observer, the exposed surface of the dial being considered its upper surface and the concealed surface its lower surface. No reference is intended by these terms to any fixed relationship with respect to the earth.

What is claimed is:

An indicator knob comprising a body of light conducting material having upper, lower and lateral surfaces, and a layer of opaque material covering the exposed upper and lateral surfaces of said knob, said upper surface and the portion of said layer immediately thereover having formed therein a recess, translucent material within said recess, the junction between said upper and lateral surfaces being provided with a beveled region extending substantially completely around the circumference of said knob, the surface of which is so inclined with respect to said recess that light directed upwardly through said body of material and impinging on said region will be redirected to said recess.

References Cited in the file of this patent

UNITED STATES PATENTS

| Number | Name | Date |
|---|---|---|
| 1,489,252 | Hough | Apr. 8, 1924 |
| 2,278,629 | Winning | Apr. 7, 1942 |
| 2,308,844 | Wilshusen | Jan. 19, 1943 |
| 2,334,479 | Creager | Nov. 16, 1943 |
| 2,595,973 | Meugass | May 6, 1952 |